(12) United States Patent
Hölker et al.

(10) Patent No.: US 9,011,685 B2
(45) Date of Patent: Apr. 21, 2015

(54) FUEL FILTER OF AN INTERNAL COMBUSTION ENGINE

(75) Inventors: Jürgen Hölker, Nottuln (DE); Christian Vinkelau, Rosendahl-Osterwick (DE)

(73) Assignee: Hengst SE & Co., KG, Muenster (DE)

( * ) Notice: Subject to any disclaimer, the term of this patent is extended or adjusted under 35 U.S.C. 154(b) by 616 days.

(21) Appl. No.: 13/395,543

(22) PCT Filed: Sep. 2, 2010

(86) PCT No.: PCT/EP2010/062906
§ 371 (c)(1),
(2), (4) Date: Mar. 12, 2012

(87) PCT Pub. No.: WO2011/032844
PCT Pub. Date: Mar. 24, 2011

(65) Prior Publication Data
US 2012/0168366 A1    Jul. 5, 2012

(30) Foreign Application Priority Data
Sep. 15, 2009   (DE) .......................... 10 2009 041 298

(51) Int. Cl.
*B01D 35/01*    (2006.01)
*B01D 35/30*    (2006.01)
*B01D 35/31*    (2006.01)
*F02M 37/22*    (2006.01)
*B01D 36/00*    (2006.01)

(52) U.S. Cl.
CPC ........... *F02M 37/221* (2013.01); *B01D 36/001* (2013.01); *B01D 2201/0415* (2013.01); *B01D 2201/291* (2013.01); *B01D 2201/305* (2013.01); *B01D 2201/34* (2013.01)

(58) Field of Classification Search
USPC .................................. 210/232, 436, 457, 458
See application file for complete search history.

(56) References Cited

U.S. PATENT DOCUMENTS

| | | | |
|---|---|---|---|
| 5,922,199 A | | 7/1999 | Hodgkins |
| 6,709,588 B2 * | | 3/2004 | Pavlin et al. .................. 210/248 |
| 7,147,110 B2 * | | 12/2006 | Clausen et al. ................ 210/436 |
| 2008/0116126 A1 * | | 5/2008 | Greiving et al. ......... 210/167.08 |

FOREIGN PATENT DOCUMENTS

| | | |
|---|---|---|
| DE | 195 19 352 | 11/1996 |
| DE | 195 38 883 | 4/1997 |
| DE | 60 2004 006277 | 1/2008 |

* cited by examiner

*Primary Examiner* — Thomas M Lithgow
(74) *Attorney, Agent, or Firm* — Greer, Burns & Crain Ltd.

(57) ABSTRACT

A fuel filter of an internal combustion engine including a filter housing having a lowermost housing base and a topmost removable housing lid. The filter housing has one raw fuel inlet and one pure fuel outlet. A replaceable annular filter insert mounts there in the filter housing, fuel flowing through it from outside towards inside. The filter subdivides an interior space of the filter housing into a raw zone and a pure zone. A supporting body is arranged in the interior of the annular filter insert, a first flow channel and a second flow channel extending therethrough. The first flow channel connects at one end to the pure zone and at the other end to the pure fuel outlet. The second flow channel connects at one end to the raw zone via a vent throttle or a vent valve and at the other end to a reservoir return in the filter housing. The raw fuel inlet is in the housing base and a flow channel leads from the raw fuel inlet to a portion of the raw zone of the interior space of the filter housing which is, during operation, topmost.

18 Claims, 9 Drawing Sheets

FUEL FILTER OF AN INTERNAL COMBUSTION ENGINE

BACKGROUND OF THE INVENTION

This invention relates to a fuel filter of an internal combustion engine, in particular of a diesel engine, with a filter housing having an operationally lower housing base and an upper, removable housing cover, with one raw fuel inlet and pure fuel outlet each being provided in the filter housing, with a replaceable ring filter insert being arranged in the filter housing through which the fuel can flow radially from the outside to the inside, said ring filter insert subdividing an interior of the filter housing into a raw area and a pure area, with a support body being arranged in the interior of the ring filter insert through which extends a first flow channel being connected, on the one hand, with the pure area and, on the other hand, with the pure fuel outlet, and a second flow channel being connected, on the one hand, with the raw area via a vent throttle or a vent valve and, on the other hand, with a tank return in the filter housing.

A fuel filter of the aforementioned type is known from DE 60 2004 006 277 T2. With this fuel filter, the raw fuel inlet is provided either on the bottom at the circumference or at the lower end wall of the filter housing. With this fuel filter, the support body is designed in two parts, with a radially outer part of the support body forming one part of the filter insert and a radially inner part of the support body forming one part of the filter housing. The fuel to be cleaned flows from the bottom to the top around the outer circumference of the filter insert and then flows through the filter insert radially from the outside to the inside. The cleaned fuel flows near the upper end of the support body into its central flow channel and through it to the pure fuel outlet. For venting the filter housing, a vent throttle is used in an upper end disk of the ring filter insert, with the raw area of the housing being in flow connection with the second flow channel via the vent throttle. On the other hand, the second flow channel in the support body is in flow connection with a tank return.

It is to be considered disadvantageous with this known fuel filter that the separation of water droplets entrained in the fuel is rendered more difficult due to the flow of the fuel to be cleaned from the bottom to the top at the outer circumference of the filter insert.

Another fuel filter is known from the document U.S. Pat. No. 5,922,199 A. This fuel filter is designed as a hanging cup system, wherein a cup-shaped housing is screwed as a bottom part onto a base here forming the upper part of the fuel filter. Maintenance of the fuel filter is here only possible from the bottom by unscrewing the hanging cup. In this case, fuel disadvantageously always remains in the cup which may easily result in pollution and renders it difficult to change the filter insert.

SUMMARY OF THE INVENTION

The present invention accordingly has the object of providing a fuel filter of the initially indicated type which avoids the aforementioned disadvantages and in which in particular a favorable arrangement of the raw fuel inlet is rendered possible and in which the separation of water droplets from the fuel is encouraged.

According to the invention, this problem is solved with a fuel filter of the initially indicated type which is characterized in that the raw fuel inlet is arranged in the housing base of the filter housing and that, in or on the fuel filter, a flow channel is provided extending from the raw fuel inlet to an operationally upper part of the raw area of the interior of the filter housing.

The arrangement according to the invention of the raw fuel inlet in the housing base provides an advantageous arrangement which does not impair maintenance of the fuel filter from the top. By passing the fuel in the upper part of the raw area of the housing interior, a fuel flow direction from top to bottom results on the outer circumference of the filter insert which encourages the separation and deposit of water droplets from the fuel in a lower area of the filter housing.

A preferred development of the invention provides that the flow channel leading from the raw fuel inlet to the operationally upper part of the raw area extends as a third flow channel through the support body. With this embodiment, three flow channels are advantageously passed through the support body, thereby achieving a high level of integration of functions with few individual parts.

To enable a stable design of the support body with flow channels having the lowest possible resistance, it is proposed that one of the three flow channels extends concentrically in the support body and that the two other flow channels extend eccentrically and in circumferential direction of the support body spaced apart from each other in it.

Another advantageous embodiment provides that the flow channel concentrically extending in the support body is the second flow channel connected with the tank return and is used for venting, and that the vent throttle or the vent valve is designed or arranged at one upper end of the support body in a wall of the support body separating the raw area from the second flow channel. With this embodiment, the vent throttle or the vent valve comes to lie at a point as far up top as possible in the filter housing so that virtually complete venting of the housing is ensured.

For a simple and fast mechanical and flow-specific connection of the fuel filter with the associated internal combustion engine, it is advantageous if, in addition to the raw fuel inlet, the pure fuel outlet and the tank return are arranged in the housing base of the filter housing and flange and/or line connections are provided on the housing base for the raw fuel inlet, the pure fuel outlet and the tank return.

For the purpose of the simplest possible installation of the fuel filter, it is advantageous that preferably the support body is mechanically connected on its lower end with the housing base and in terms of flow with the raw fuel inlet, the pure fuel outlet and the tank return.

A particularly advantageous connection, also disconnectable if necessary, is realized such that the housing base and the support body are preferably provided with interacting threads for their connection with each other and that the threads are designed such that, in screwed together condition, the support body assumes relative to the housing base in circumferential direction a defined screwing end position angularly aligned for the flow-specific connection with the raw fuel inlet, the pure fuel outlet and the tank return.

Since fuel filters according to the invention are a mass product, it is essential that they can be produced economically in large quantities. A contribution to this objective will be that preferably the support body with the three flow channels extending therein is a one-piece plastic injection molding or a one-piece light metal casting.

To prevent that water separated from the raw fuel impairs the filter function or gets into the pure fuel, the invention proposes that the housing base is designed or connected with a water collection chamber forming, during operation, a lowest part of the fuel filter. To this end, a water collection cup can be built on, e.g. screwed on, to the bottom of the filter housing.

Finally, it is also provided according to the invention that the housing cover and the ring filter insert are connected with each other via a detachable latching connection transmitting axial tensile forces and that, by a movement of the housing cover together with the ring filter insert relative to the filter housing and the support body, a direct flow connection is upwardly releasable from the raw area to the tank return. This is to achieve that, upon maintenance of the fuel filter, a removal of the housing cover can lift off the filter insert together with the cover. Simultaneously, it is provided that fuel present in the filter housing is discharged from the housing through the tank return. Upon its removal from the filter housing, the filter insert is then virtually free of fuel and any pollution will thus be prevented.

BRIEF DESCRIPTION OF THE DRAWINGS

In the following, an exemplary embodiment of the invention is explained by means of a drawing. In the Figures of the drawing.

DETAILED DESCRIPTION OF THE PREFERRED EMBODIMENTS

Figure 1:
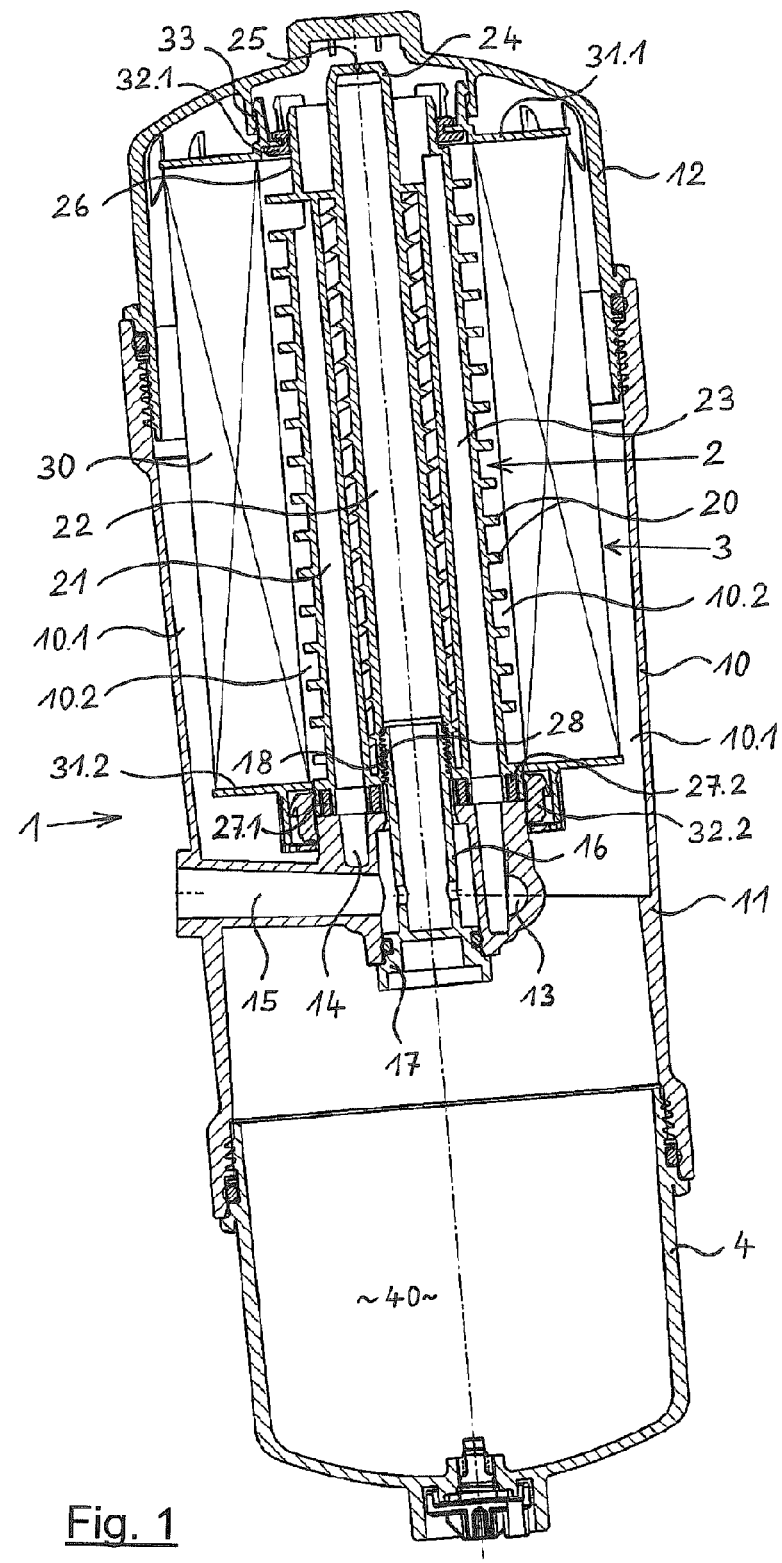
FIG. 1 shows a fuel filter with closed housing, in a longitudinal section.

FIG. 1 shows a fuel filter 1 in longitudinal section. The fuel filter 1 has a filter housing 10 with a housing base 11 and a topside housing cover 12. A ring filter insert 3 is arranged in the filter housing 10. On the inside of the ring filter insert 3, a support body 2 is provided which is connected on its bottom end with the housing base 11, here screwed. The lowermost part of the filter housing 10 is formed by a water collection cup 4 forming a water collection chamber 40.

On its outer circumference, the support body 2 has a plurality of support ribs 20 protecting a filter media body 30 of the ring filter insert 3 from collapsing. Altogether three flow channels 21, 22 and 23 extend on the inside of the support body 2. The first flow channel 21 is used to pass pure fuel from a pure area 10.2 of the housing 10 to a pure fuel outlet 14. The second flow channel 22 in the center of the support body 2 is used to vent the filter housing 10. To this end, the upper end 24 of the support body 2 is closed except for a vent throttle 25. On the lower end, the second flow channel 22 is in flow connection with a tank return 15. The third flow channel 23 is used to pass raw fuel from a raw fuel inlet 13 into an upper part of the raw area 10.1 of the filter housing 10.

The ring filter insert 3 consists of a hollow cylindrical filter media body 30 which is bordered on the top by an upper end disk 31.1 and on the bottom by a lower end disk 31.2. Arranged on the upper end disk 31.1 is a radial seal 32.1 which seals against an upper ring area 26 of the support body 2. Under the lower end disk 31.2, another radial seal 32.2 is arranged which seals off against a lower end of the support body 2 as well as an area of the housing base 11 bearing the support body 2.

The support body 2 screwed together with the housing base 11 is sealed with two axial seals 27.1 and 27.2 against the base 11. Threads 18 and 28 are used for screwing. Thread 18 is arranged on the upper end of a support body screw neck 16 and the thread 28 is an internal thread in the lower end area of the second flow channel 22 of the support body 2. The support body screw neck 16 is inserted from the bottom into a suitable opening in the base 11 and has an enlarged head 17 forming a stop.

The raw fuel inlet 13 and the pure fuel outlet 14 extend perpendicularly to the drawing planes of FIG. 1 from the cutting plane towards the front so that they are visible only for a small part. The raw fuel inlet 13 is usually connected via a fuel line with an active fuel pump to the associated fuel tank. The pure fuel outlet 14 usually leads via another line to a fuel injection system of the associated internal combustion engine. The tank return 15 extends from the center of the housing base 11 to the left. Through a connection line not shown, the tank return 15 is connected with the fuel tank of the associated internal combustion engine.

The housing cover 12 is screwed with the filter housing 10 and can be unscrewed for maintenance of the fuel filter 1. On the inside of the housing cover 12, a detachable latching connection 33 is arranged between that and the ring filter insert 3 which is able to transmit axial tensile forces from the housing cover 12 to the ring filter insert 3 which are large enough to pull off the ring filter insert 3 from the housing base 11 and the support body 2.

During operation of the fuel filter 1, raw fuel flows through the raw fuel inlet 13 into the third flow channel 23 of the support body 2 and in it to the top where the raw fuel exits from the support body 2 in the raw area 10.1 of the filter housing 10. From the raw area 10.1, fuel flows through the filter media body 30 of the ring filter insert 3 in radial direction from the outside to the inside and then gets into the pure area 10.2. In the pure area 10.2, the now filtered fuel flows upwardly and there enters into the first flow channel 21 of the support body 2. In flow channel 21, the filtered fuel flows downwardly to the pure fuel outlet 14.

Due to feeding raw fuel into the upper part of the raw area 10.1, a downward flow of the fuel results in the interior of the filter housing 10 on the outer circumference of the filter media body 30. This direction of flow encourages the separation of entrained water droplets from the raw fuel and their deposit in the water collection chamber 40.

Dirt particles entrained in the raw fuel are separated and collected in the filter media body 30. Water droplets contained in raw fuel collect on the filter media body 30 and, upon reaching a certain size, they trickle down from it and sink to the bottom in the fuel due to their higher density and thus get into the water collection chamber 40. The water collection chamber 40 in the water collection cup 4 can be automatically drained as needed, in a manner known per se, via a corresponding water drain valve not shown here.

Figure 2:
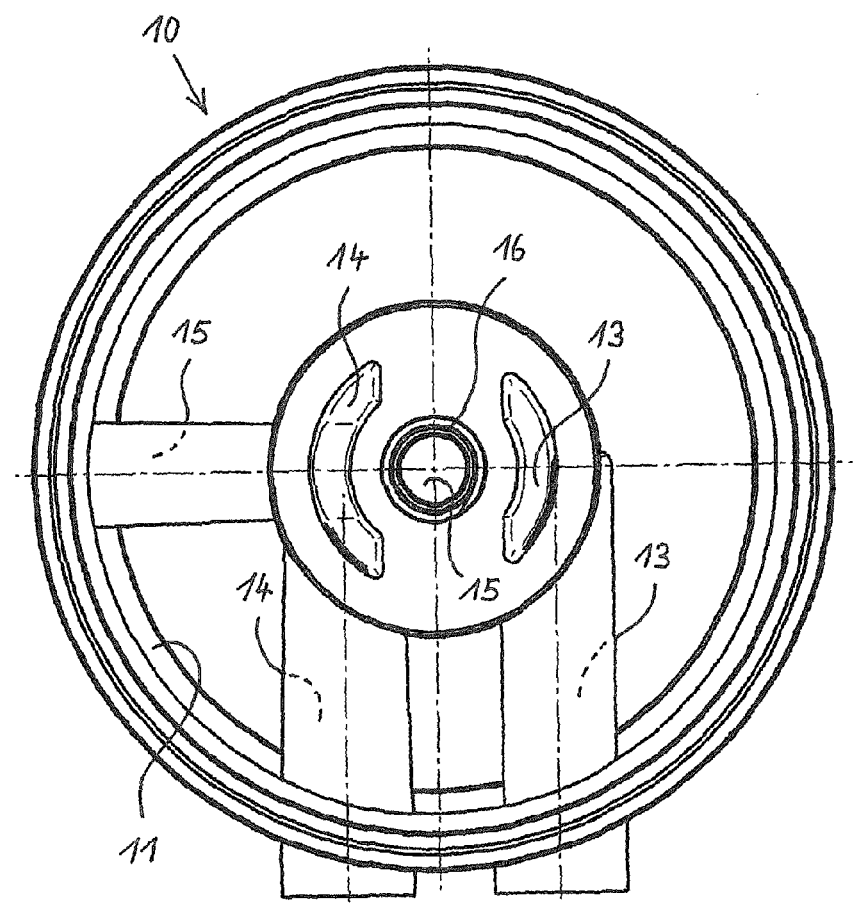
FIG. 2 shows the fuel filter of FIG. 1 with opened housing and removed filter insert, in a top view.

FIG. 2 shows the filter housing 10 of the fuel filter from FIG. 1 in a top view with the housing cover 12 removed and with the ring filter insert 3 taken from the filter housing 10. In the center of FIG. 2, the tank return 15 can be seen which continues towards the left to the outside of the housing 10. In FIG. 2, the raw fuel inlet 13 extends from bottom to top, i.e. radially from the outside to the inside; in reverse, the pure fuel outlet 14 extends parallel thereto. The support body screw neck 16 is visible around the central tank return 15. The housing base 11 lies in the background of FIG. 2.

Figure 3:
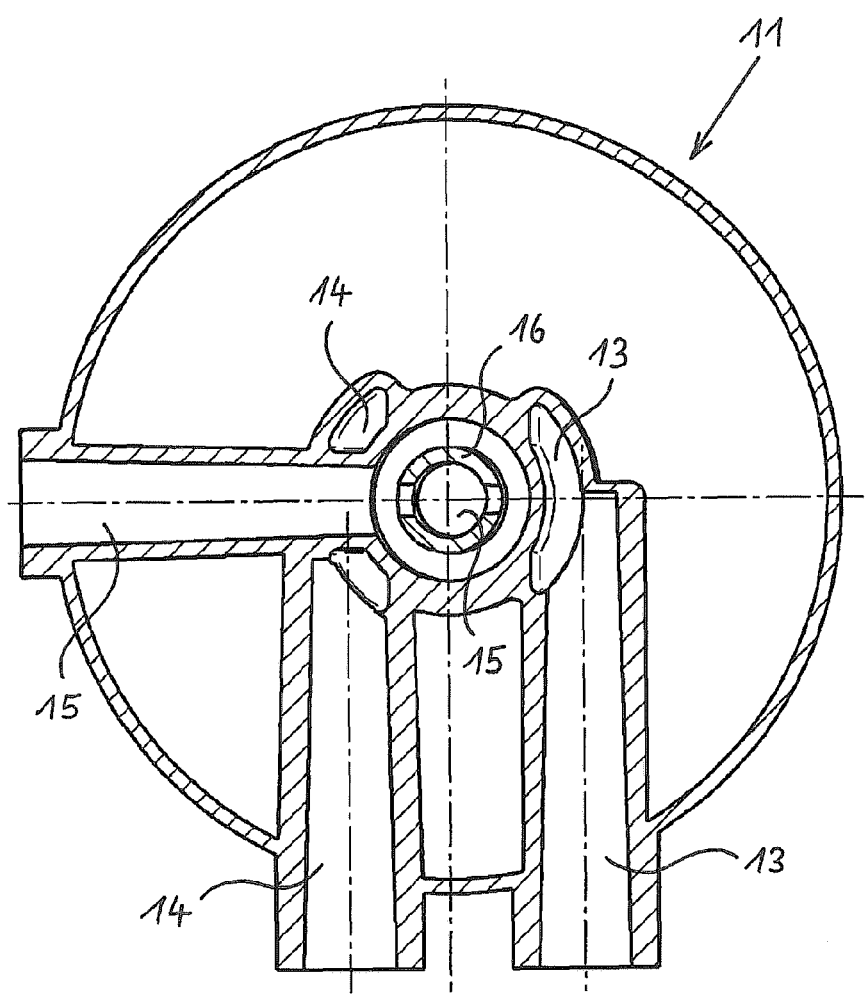
FIG. 3 shows the fuel filter in a cross-section at the level of a housing base of the filter housing.

FIG. 3 shows the filter housing in a cross section through the housing base 11. In this respect, the cut runs through the raw fuel inlet 13, the pure fuel outlet 14 and through the tank return 15. In the center of the housing base 11, the support body screw neck 16 is visible through which extends a section of the tank return 15.

Figure 4:
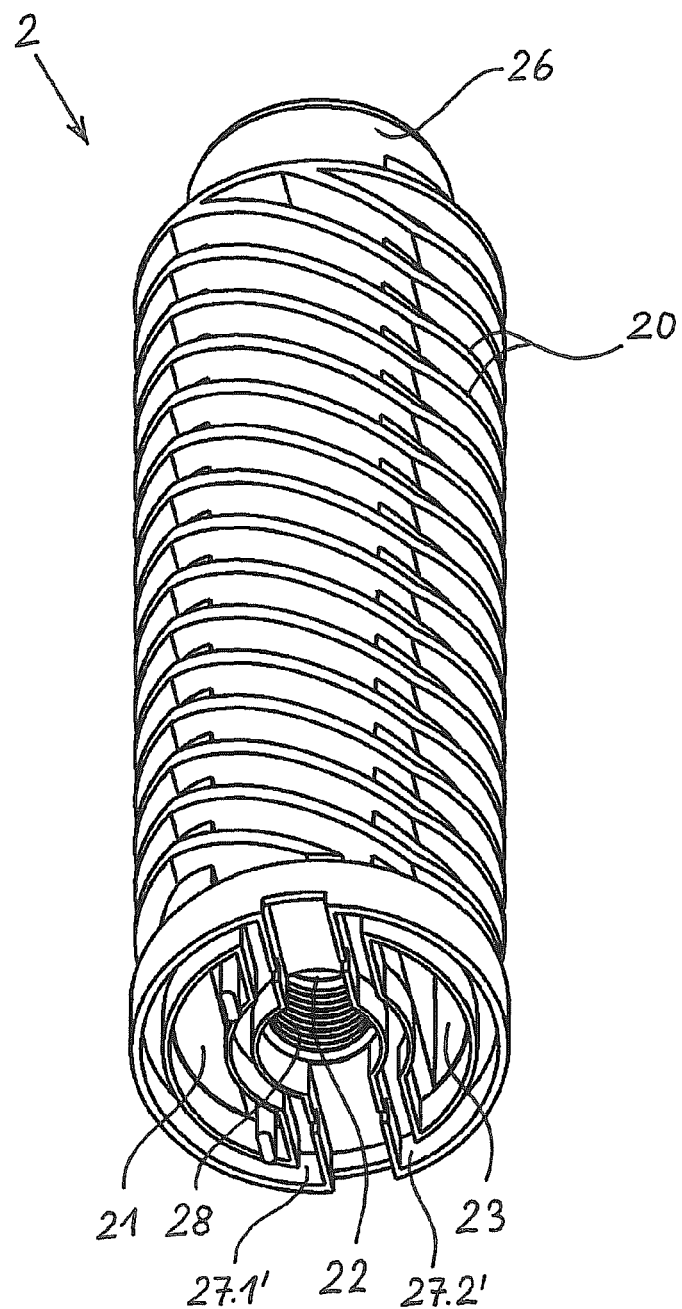
FIG. 4 shows a support body as part of the fuel filter, in a perspective view inclined from the bottom.

In FIG. 4, the support body 2 as a part of the fuel filter 1 is presented by itself in a perspective view at an incline from below. Support ribs 20 are visible on the outer circumference of the support body 2. On the lower end of the support body 2, its front face with flow channels 21, 22 and 23 is visible. A sealing groove 27.1' extends around the first flow channel 21, and another sealing groove 27.2' extends around the third flow channel 23. In the center of the support body 2, its thread 28 for the connection with the housing base 11 is visible. On the upper end of the support body 2, its upper ring area 26 is located.

Figure 5:
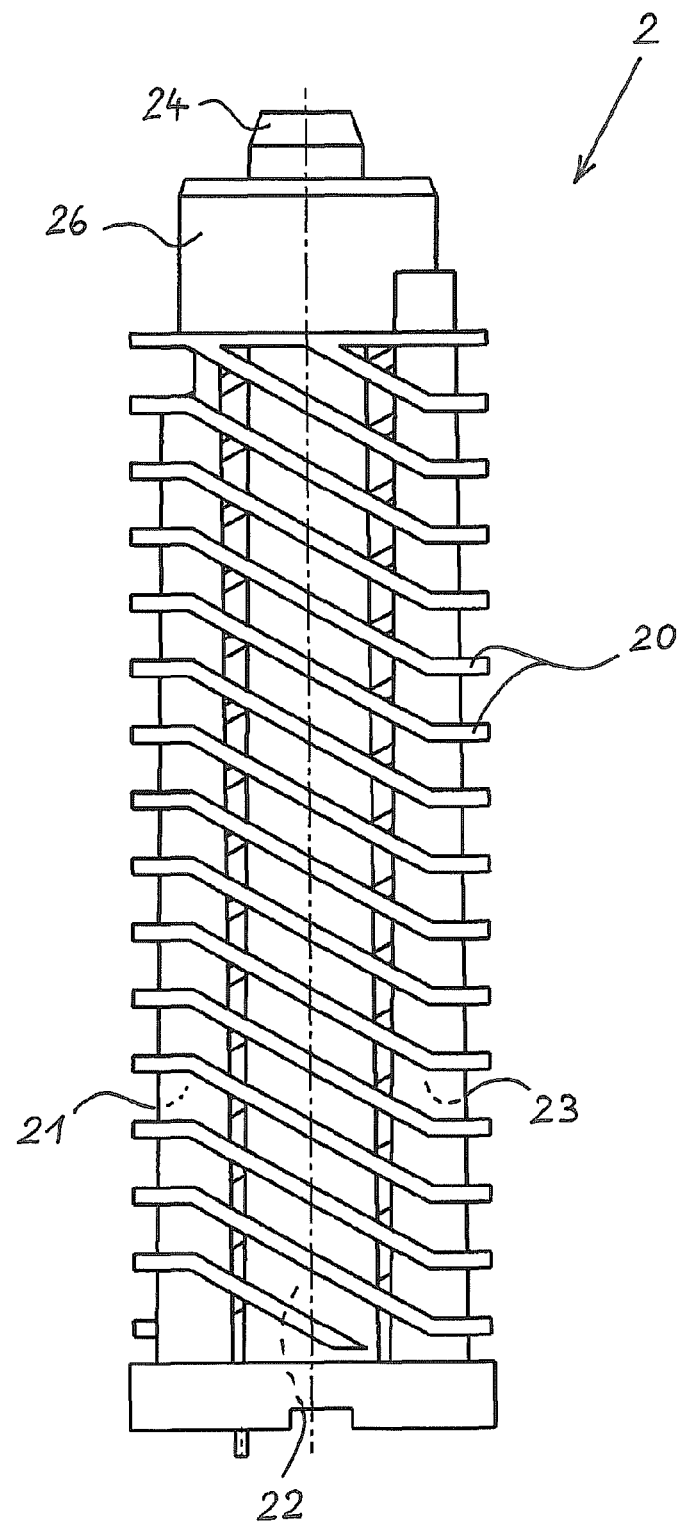
FIG. 5 shows the support body from FIG. 4 in a side view.

FIG. 5 shows the support body 2 again as an individual part, now in a side view. The first flow channel 21 extends on the left in the support body 2, in its longitudinal direction. The second flow channel 22 extends centrally through the support body 2. The third flow channel 23 extends on the right of the support body 2 in longitudinal direction. The support ribs 20 extend around the flow channels 21, 22 and 23 in the form of spirals. The upper termination of the support body 2 is its upper end 24. Below that is the upper ring area 26 of the support body 2 which serves as the sealing rest of the ring filter insert 3.

Figure 6:
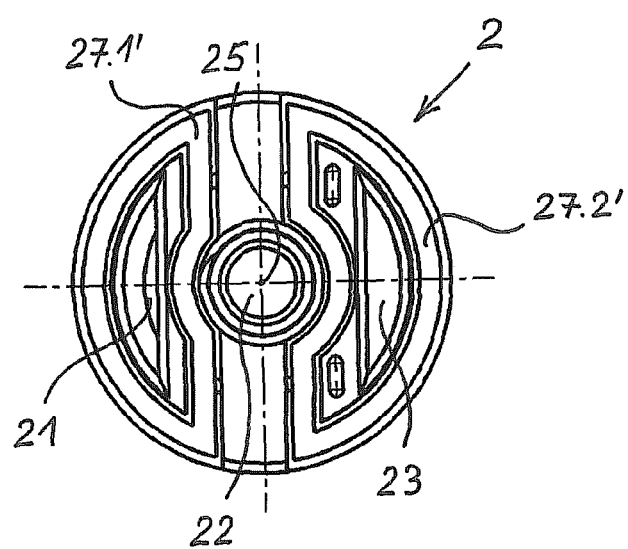
FIG. 6 shows the support body from FIG. 4 and FIG. 5 in a view from the bottom.

FIG. 6 shows the support body 2 in a view onto its underside. In the center of FIG. 6, the view extends through the central, second flow channel 22 up to the vent throttle 25 at the upper end of the support body 2. The first flow channel 21 lies on the left of flow channel 23. The third flow channel 23 lies on the right of the central flow channel 22. The sealing groove 27.1' runs around the flow channel 21. The sealing groove 27.2' runs around the flow channel 23.

As illustrated in a joint view of FIGS. 2 and 6, the central area of the base 11 and the lower front end of the support body 2 are geometrically coordinated such and adjusted to each other that—with the support body 2 firmly screwed together with the housing base 11—the flow channels 21 and 23 are lined up with the pure fuel outlet 14 and the raw fuel inlet 13. To this end, the aforementioned threads 18 and 28 are arranged such that, upon screwing the support body 2 to the housing base 11, an end position of the screwing defined in circumferential direction results in which the overlap required for the flow connections is realized.

Figure 7:
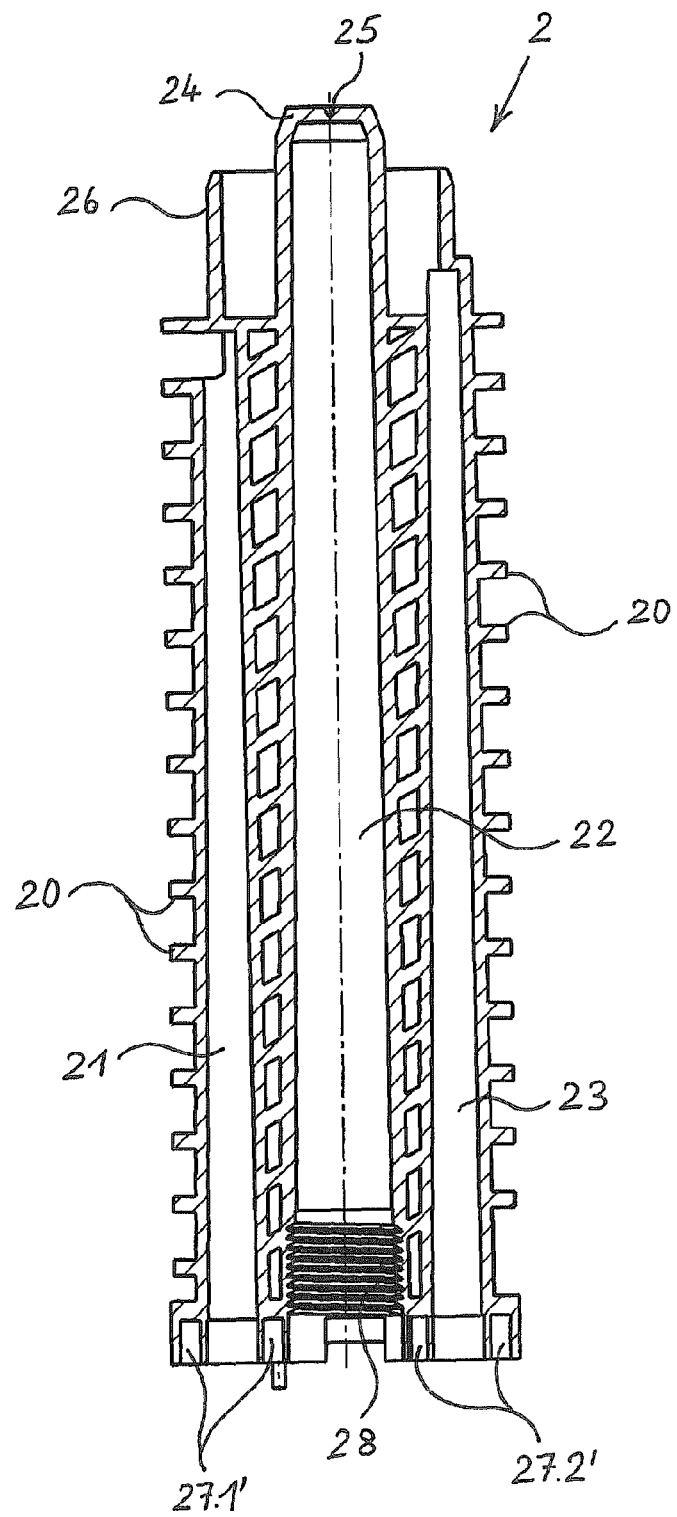
FIG. 7 shows the support body from FIGS. 4 to 6 in a longitudinal section.

FIG. 7 shows the support body 2 in a longitudinal section. Support ribs 20 are here also visible radially outside. The second flow channel 22 extends centrally through the support body 2. The first flow channel 21 is visible on the left thereof. The third flow channel 23 extends on the right from the central flow channel 22. The two sealing grooves 27.1' and 27.2' are visible on the lower end of the support body 2. Thread 28 is visible in the lower end area of the central, second flow channel 22. The central, second flow channel 22 is closed towards the top by the upper end 24 of the support body 2 with the exception of the vent throttle 25 there attached. In addition, the upper ring area 26 is visible in the upper end area of the support body 2.

It is evident on the basis of FIGS. 4 to 7 that, despite its relatively complicated form and the three flow channels 21 to 23 extending therein, the support body 2 can be advantageously produced by injection molding as a one-piece component. The support body can be removed from the mold in two radial directions opposite each other and in two axial directions opposite each other.

As already mentioned above in connection with FIG. 1, the latching connection 33 exists between the housing cover 12 and the ring filter insert 3. Its purpose is explained in the following on the basis of FIGS. 8 and 9.

Figure 8:
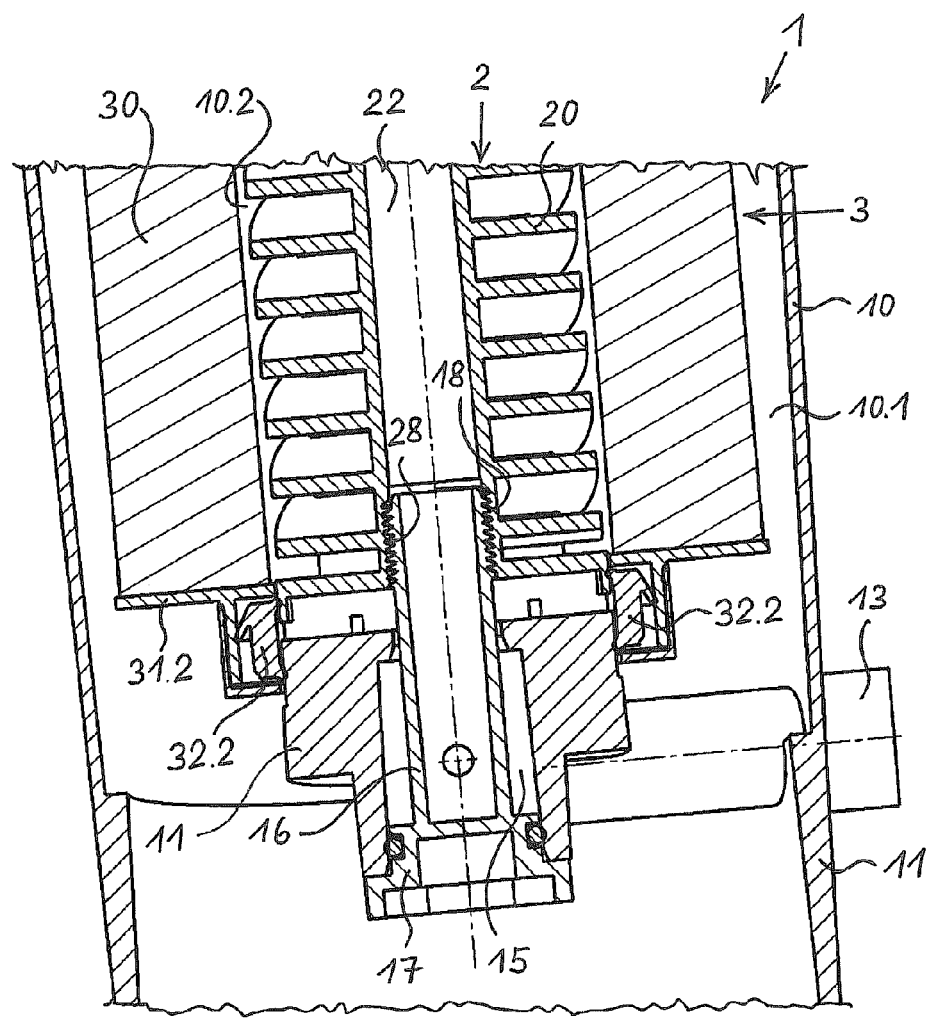
FIG. 8 shows the fuel filter in a partial longitudinal section with inserted filter insert.

In the longitudinal section, FIG. 8 presents a segment of the fuel filter 1 at the level of the housing base 11 and the lower part of the ring filter insert 3, the cutting plane here being rotated by 90° versus FIG. 1. In FIG. 8, the ring filter insert 3 is completely inserted into the filter housing 10 and sits, on the one hand, with its lower part on the lower end area of the support body 2 and, on the other hand, on the central part of the base 11 facing it. The radial sealing ring 32.2 is arranged between the lower end disk 31.2 of the ring filter insert 3, on the one hand, and the support body 2 as well as the housing base 11, on the other hand. In the built-in condition of the ring filter insert 3, the radial sealing ring 33.2 covers up—due to its adequate height in axial direction—an annular gap between the lower end of the support body 2 and the housing base 11. This annular gap covered up in the condition according to FIG. 8 is in flow connection with the tank return 15.

Figure 9:
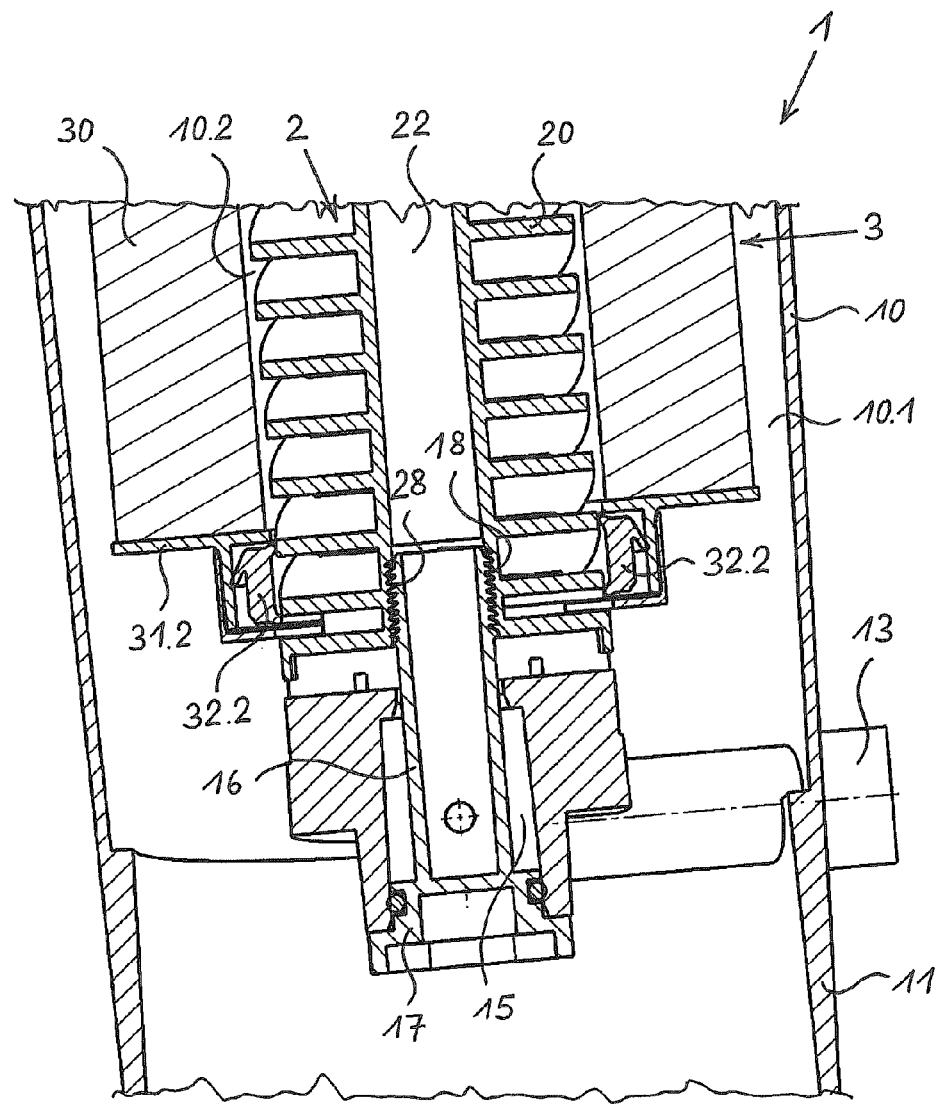
FIG. 9 shows the fuel filter from FIG. 8 while the filter insert is removed, in the same presentation as in FIG. 8.

In the same presentation as FIG. 8, FIG. 9 shows the ring filter insert 3 during its removal from the filter housing 10. This removal is effected by unscrewing the housing cover 12 carrying along the ring filter insert 3 via the latching connection 33. Due to the movement of the ring filter insert 3 towards the top, the lower end disk 31.2 with the radial sealing ring 32.2 is also moved upwardly and thus recedes from the transition area or annular gap between the lower end of the support body 2 and the upper side of the central part of the housing base 11. The raw area 10.1 of the filter housing 10 thereby realizes a flow connection with the tank return 15. In this way, already while twisting off the housing cover 12, fuel from the filter housing 10 can flow off through the tank return 15 into the fuel tank so that, with opened filter housing 10, the ring filter insert 3 can be removed virtually fuel-free.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

| List of reference symbols: | |
|---|---|
| Symbol | Designation |
| 1 | Fuel filter |
| 10 | Filter housing |
| 10.1 | Raw area |
| 10.2 | Pure area |
| 11 | Housing base |
| 12 | Housing cover |
| 13 | Raw fuel inlet |
| 14 | Pure fuel outlet |
| 15 | Tank return |
| 16 | Support body screw neck |
| 17 | Head of 16 |
| 18 | Thread on 16 |
| 2 | Support body |
| 20 | Support ribs |
| 21 | First flow channel |
| 22 | Second flow channel |
| 23 | Third flow channel |
| 24 | Upper end of 2 |
| 25 | Vent throttle |

-continued

List of reference symbols:

| Symbol | Designation |
| --- | --- |
| 26 | Upper ring area |
| 27.1, 27.2 | Seals |
| 27.1', 27.2' | Sealing grooves |
| 28 | Thread on 2 |
| 3 | Ring filter insert |
| 30 | Filter media body |
| 31.1 | Upper end disk |
| 31.2 | Lower end disk |
| 32.1 | Seal on 31.1 |
| 32.2 | Seal on 31.2 |
| 33 | Latching connection between 12 and 3 |
| 4 | Water collection cup |
| 40 | Water collection chamber |

The invention claimed is:

1. A fuel filter of an internal combustion engine, with a filter housing having an operationally lower housing base and an operationally upper, removable housing cover, with a raw fuel inlet and a pure fuel outlet and a tank return each being provided in the filter housing, with a replaceable ring filter insert being arranged in the filter housing through which the fuel can flow radially from the outside to the inside, said filter having a center support body for said ring filter insert, said ring filter insert subdividing an interior of the filter housing into a raw area and a pure area, a first flow channel extending through the center support body and being connected with the pure area at one end and with the pure fuel outlet at an opposite end, a second flow channel extending through the center support body as a vent pipe defining a vent channel being connected, at one end, with the raw area via one of a vent throttle and a vent valve and, at an opposite end, with the tank return in the filter housing, with the raw fuel inlet being arranged in the housing base of the filter housing, a third flow channel extending through said center support body and leading from the raw fuel inlet to an operationally upper part of the raw area of the interior of the filter housing.

2. The fuel filter according to claim 1, wherein one of the three flow channels extends concentrically in the support body and the two other flow channels extend within the support body eccentrically and spaced apart from each other in circumferential direction of the support body.

3. A fuel filter according to claim 2, wherein the flow channel concentrically extending in the support body is the second flow channel connected with the tank return and used for venting, and the one of the vent throttle and the vent valve is arranged at an upper end of the support body in a wall of the support body separating the raw area from the second flow channel.

4. A fuel filter according to claim 1, wherein in addition to the raw fuel inlet, the pure fuel outlet and the tank return are arranged in the housing base of the filter housing, and at least one of a flange and line connections are provided on the housing base for the raw fuel inlet, the pure fuel outlet and the tank return.

5. A fuel filter according to claim 4, wherein the support body is connected mechanically on its lower end with the housing base and in terms of flow with the raw fuel inlet, the pure fuel outlet and the tank return.

6. A fuel filter according to claim 5, wherein the housing base and the support body are provided with interacting threads for their connection with each other and that the threads are arranged such that, in screwed together condition, the support body assumes relative to the housing base in circumferential direction a defined position angularly aligned for the flow-specific connection with the raw fuel inlet, the pure fuel outlet and the tank return.

7. A fuel filter according to claim 1, wherein the support body with the three flow channels extending therein is one of a one-piece plastic injection molding and a one-piece light metal casting.

8. A fuel filter according to claim 1, wherein the housing base is connected with a water collection chamber forming, during operation, a lowest part of the fuel filter.

9. A fuel filter according to claim 1, wherein the housing cover and the ring filter insert are connected with each other via a detachable latching connection transmitting axial tensile forces and, by a movement of the housing cover together with the ring filter insert relative to the filter housing and the support body upwardly, a direct flow connection is releasable from the raw area to the tank return.

10. A fuel filter of an internal combustion engine, comprising:
a filter housing having an operationally lower housing base and an operationally upper, removable housing cover, with a raw fuel inlet and a pure fuel outlet and a tank return each being provided in the filter housing,
a replaceable ring filter insert arranged in the filter housing through which the fuel flows radially from the outside to the inside, said ring filter insert subdividing an interior of the filter housing into a raw area and a pure area, said filter having a center support body for said ring filter insert;
a first flow channel extending through the center support body and connected with the pure area at one end and with the pure fuel outlet at an opposite end;
a second flow channel extending through said center support body and said second flow channel comprises a vent pipe which defines a vent channel being connected, at one end, with the raw area via one of a vent throttle and a vent valve and, at an opposite end, with said tank return in the filter housing,
the raw fuel inlet arranged in the housing base of the filter housing,
a third flow channel extending through the center support body and leading from the raw fuel inlet to an operationally upper part of the raw area of the interior of the filter housing.

11. The fuel filter according to claim 10, wherein one of the three flow channels extends concentrically in the support body and the two other flow channels extend within the support body eccentrically and spaced apart from each other in circumferential direction of the support body.

12. A fuel filter according to claim 11, wherein the flow channel concentrically extending in the support body is the second flow channel connected with the tank return and used for venting, and the one of the vent throttle and the vent valve is arranged at an upper end of the support body in a wall of the support body separating the raw area from the second flow channel.

13. A fuel filter according to claim 10, wherein in addition to the raw fuel inlet, the pure fuel outlet and the tank return are arranged in the housing base of the filter housing, and at least one of a flange and line connections are provided on the housing base for the raw fuel inlet, the pure fuel outlet and the tank return.

14. A fuel filter according to claim 13, wherein the support body is connected mechanically on its lower end with the housing base and in terms of flow with the raw fuel inlet, the pure fuel outlet and the tank return.

15. A fuel filter according to claim 14, wherein the housing base and the support body are provided with interacting threads for their connection with each other and that the threads are arranged such that, in screwed together condition, the support body assumes relative to the housing base in circumferential direction a defined position angularly aligned for the flow-specific connection with the raw fuel inlet, the pure fuel outlet and the tank return.

16. A fuel filter according to claim 10, wherein the support body with the three flow channels extending therein is one of a one-piece plastic injection molding and a one-piece light metal casting.

17. A fuel filter according to claim 10, wherein the housing base is connected with a water collection chamber forming, during operation, a lowest part of the fuel filter.

18. A fuel filter according to claim 10, wherein the housing cover and the ring filter insert are connected with each other via a detachable latching connection transmitting axial tensile forces and, by a movement of the housing cover together with the ring filter insert relative to the filter housing and the support body upwardly, a direct flow connection is releasable from the raw area to the tank return.

\* \* \* \* \*